US006666768B1

(12) United States Patent
Akers

(10) Patent No.: US 6,666,768 B1
(45) Date of Patent: Dec. 23, 2003

(54) SYSTEM AND METHOD FOR TRACKING GAME OF CHANCE PROCEEDS

(76) Inventor: David J. Akers, 2535 Fenwick Rd., University Heights, OH (US) 44118

( * ) Notice: Subject to any disclaimer, the term of this patent is extended or adjusted under 35 U.S.C. 154(b) by 182 days.

(21) Appl. No.: 09/800,162

(22) Filed: Mar. 6, 2001

(51) Int. Cl.$^7$ ................................................ A63F 3/06
(52) U.S. Cl. .......................... 463/40; 463/41; 463/43; 463/16; 705/14; 705/16
(58) Field of Search .................. 705/14, 16; 463/40–43, 463/16–22, 25, 12, 19; 379/114.11; 273/138.1

(56) References Cited

U.S. PATENT DOCUMENTS

| | | | | |
|---|---|---|---|---|
| 4,815,741 A | * | 3/1989 | Small | 463/17 |
| 5,025,372 A | * | 6/1991 | Burton et al. | 705/14 |
| 5,275,400 A | * | 1/1994 | Weingardt et al. | 463/12 |
| 5,518,253 A | * | 5/1996 | Pocock et al. | 463/19 |
| 5,833,540 A | * | 11/1998 | Miodunski et al. | 463/42 |
| 5,871,398 A | * | 2/1999 | Schneier et al. | 463/16 |
| 5,909,486 A | * | 6/1999 | Walker et al. | 379/114.11 |
| 6,024,640 A | * | 2/2000 | Walker et al. | 463/17 |
| 6,302,793 B1 | * | 10/2001 | Fertitta et al. | 463/25 |
| 6,402,614 B1 | * | 6/2002 | Schneier et al. | 463/17 |
| 6,434,534 B1 | * | 8/2002 | Walker et al. | 705/14 |
| 6,497,408 B1 | * | 12/2002 | Walker et al. | 273/138.1 |

FOREIGN PATENT DOCUMENTS

| | | | |
|---|---|---|---|
| WO | WO 00/079461 A1 | * 12/2000 | G06F/17/60 |
| WO | WO 01/83062 A1 | * 11/2001 | A63F/13/00 |

* cited by examiner

Primary Examiner—Teresa Walberg
Assistant Examiner—Y Cherubin
(74) Attorney, Agent, or Firm—Amin & Turocy, LLP

(57) ABSTRACT

A system and method for tracking game of chance proceeds are provided. The invention includes a point of sale computer electronically communicating registered player purchase information to a sponsor computer. The invention further includes a sponsor computer calculating a registered player set aside based upon the registered player purchase information. The invention further includes the sponsor computer electronically communicating registered player set aside to an account manager with the account manager maintaining registered player account for the benefit of the registered player. The registered player accounts can be personal retirement accounts, medical savings accounts, real estate investment accounts, small business investment accounts and/or educational savings accounts. The invention further comprises methodologies and tools for facilitating game of chance proceed tracking.

35 Claims, 10 Drawing Sheets

SYSTEM AND METHOD FOR TRACKING GAME OF CHANCE PROCEEDS

TECHNICAL FIELD

The present invention relates generally to a system and method for tracking game of chance play and proceeds. More particularly, the invention relates to a system and method for allocating a portion of a player's purchase and/or potential winnings to a player's account.

BACKGROUND OF THE INVENTION

Games of chance (e.g., lotteries) have been offered by various sponsors (e.g., government agencies and private industry) depending upon the laws of each State. With the proliferation of States allowing casinos, river boat gambling and lotteries, increasingly, sponsors have engaged in competition for the gaming public's money. For example, State-operated games of chance (e.g., lotteries) are engaged in competition with other forms of legal gaming (e.g., church-sponsored bingo, casinos, online gaming and/or racing) and illegal gaming. At present, there are approximately thirty-seven States that operate lotteries and games of chance to benefit the State.

Public perception of State-sanctioned gaming has also influenced sponsors. Further, a disproportionate amount of the gaming public playing state lotteries is comprised of economically, educationally and/or socially disadvantaged citizens. For example, States that are now dependent upon lottery-generated funds, find themselves in the uncomfortable position of promoting gaming in order to generate revenue with a disproportionate amount of the revenue being raised from the economically, educationally and/or socially disadvantaged. Further, the gaming industry is in a state of flux, with a variety of factors influencing both the financial viability and public perception of State-sanctioned gaming. Significant competitive variables include the proliferation of states in which casinos and/or lotteries are now legal, the increasing reliance of government bodies on the funds generated by state-regulated gaming, the rapid acceptance and use of online and electronic gaming, and the introduction of multi-government-body lotteries with ever-larger jackpots. Thus, State-operated lotteries and games of chance are engaged in a fierce competition for customers with other forms of gaming opportunities.

Generally, state lotteries are totally anonymous, with the exception of the recipients of large prizes, who are paid by the State directly. Thus, there is an unfilled need for a system and method for tracking lottery play and proceeds.

SUMMARY

The following presents a simplified summary of the invention in order to provide a basic understanding of some aspects of the invention. This summary is not an extensive overview of the invention. It is not intended to identify key or critical elements of the invention or to delineate the scope of the invention. Its sole purpose is to present some concepts of the invention in a simplified form as a prelude to the more detailed description that is presented later.

The present invention relates to a system and method for tracking lottery play and proceeds. More particularly, the present invention enables sponsors (e.g., state agencies) of gaming opportunities (e.g., lotteries) to track, understand and strategically reward the play of individual players thereby increasing the sponsor's competitiveness in the market place for gaming funds. Further, the system and method of the present invention increase the social acceptance of the sponsor's gaming opportunities by allowing a predetermined amount of a registered player's purchases (e.g., set aside amount) to be deposited in a registered player account for the benefit of the registered player or his/her designate (e.g., personal retirement account, medical savings account, real estate investment account, small business investment account and/or educational savings account).

According to one aspect, of the present invention, a registered player is able to purchase game of chance items (e.g., lottery tickets) from the sponsor through a point of sale computer (e.g., lottery ticket vendor). The registered player identifies himself at the point of sale computer (e.g., using an identification card or driver's license). The registered player then purchases and receives his game of chance items (e.g., lottery tickets). Information regarding the registered player's purchases is electronically communicated to the sponsor's computer system where the registered player's information is updated to reflect the registered player's purchases. The registered player's set aside amount is increased by a predetermined portion of the registered player's purchase (e.g., ten percent). Once the registered player's set aside amount reaches a predetermined threshold level (e.g. fifty dollars) in a predetermined period of time (e.g. one year), the registered player's set aside amount is transferred to an account manager which maintains a registered player account for the benefit of the registered player or his/her designate (e.g., personal retirement account, medical savings account, real estate investment account, small business investment account and/or educational savings account).

According to another aspect of the present invention, a registered player is able to purchase game of chance items (e.g., lottery tickets) directly from the sponsor utilizing a player communication device (e.g., personal computer, telephone or terminal). The registered player identifies himself to the sponsor computer by electronically communicating via the player communication device. The registered player then purchases and receives his game of chance items (e.g., lottery tickets). Information regarding the registered player's purchases is electronically communicated to the sponsor's computer system where the registered player's information can be updated to reflect the registered player's purchases. The registered player's set aside amount is increased by a predetermined portion of the registered player's purchases (e.g., ten percent). Once the registered player's set aside amount reaches a predetermined threshold level (e.g. fifty dollars) in a predetermined period of time (e.g. one year), the registered player's set aside amount is transferred to an account manager which maintains a registered player account for the benefit of the registered player or his/her designate (e.g., personal retirement account, medical savings account, real estate investment account, small business investment account and/or educational savings account).

According to yet another aspect of the present invention, a registered player can make direct contributions to his registered player account through a point of sale computer, a player communication device and/or mail. Further, the sponsor is able to utilize information contained in the registered player's information stored in the sponsor's computer for targeted marketing campaigns, product development, and/or facilitating registered player income tax reporting (e.g., information regarding registered player's yearly purchases sent to registered player to provide evidence of a gambling loss deduction and/or enable a potential set off against winnings for a tax year).

The present invention also provides methods for tracking game of chance play and proceeds; transferring registered player's set aside amounts to a registered player account; establishing registered player set asides and registered player accounts.

To the accomplishment of the foregoing and related ends, certain illustrative aspects of the invention are described herein in connection with the following description and the annexed drawings. These aspects are indicative of but a few of the various ways in which the principles of the invention may be employed and the present invention is intended to include all such aspects and their equivalents. Other advantages and novel features of the invention may become apparent from the following detailed description of the invention when considered in conjunction with the drawings.

DESCRIPTION OF THE INVENTION

Figure 1:
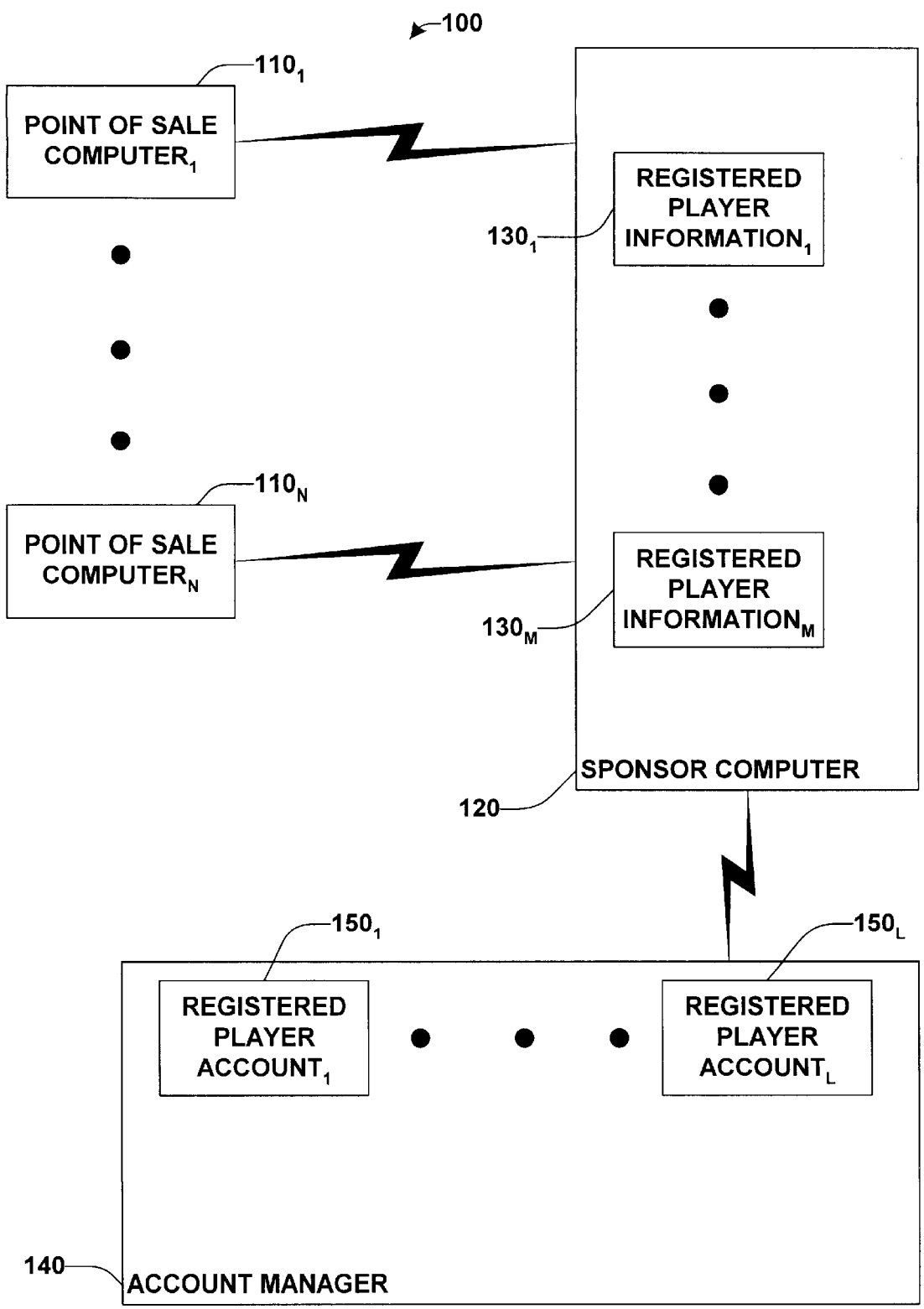
FIG. 1 is a schematic block diagram illustrating a game of chance proceed tracking system in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident to one skilled in the art that the present invention may be practiced without these specific details. In other instances, well-known structures and devices are shown in block diagram form in order to facilitate description of the present invention.

A "sponsor" is an entity or group of entities that promote, operate and/or manage legal games of chance (e.g., government agencies and/or private industry). As used in this application, the term "game of chance item" refers to an item associated with recording the gaming process purchased from a sponsor including, but not limited to lottery tickets, scratch and win tickets, purchases from video lottery terminals and instant bingo cards, for example. A "game of chance item" may be a physical item (e.g., lottery ticket) and/or an electronic record of the purchase (e.g., identifier associated with the purchase).

A "real estate investment account" is an account that is used for a designated real estate investment purpose(s), for example, home improvement, residential home purchase and/or multi-family units. A "small business investment account" is an account that is used for designated business purpose(s), for example, to capitalize a new business entity, to invest in a business entity and/or to purchase a business entity.

Referring to FIG. 1, a game of chance proceed tracking system 100 is illustrated. The system 100 includes a point of sale computer $110_1$ through an Nth point of sale computer $1100_N$, N being an integer. The point of sale computers $110_1$ through $110_N$ can be referred to collectively as the point of sale computer 110. The point of sale computer 110 communicates electronically (e.g., via a direct connection, the Internet, dial-up modem connection, local area network, wide area network, wireless network or personal area network) with a sponsor computer 120 and is further adapted to identify (e.g., touch screen computer system, magnetic strip scanner, electronic signature pad, digital camera, finger print recognition system, iris scanner and/or alpha numeric entry device) a registered player. The identification of a registered player can be performed by the registered player or another person (e.g., store clerk). The sponsor computer 120 and/or the point of sale computer 110 are adapted to determine that a player is a registered player.

Figure 2A:
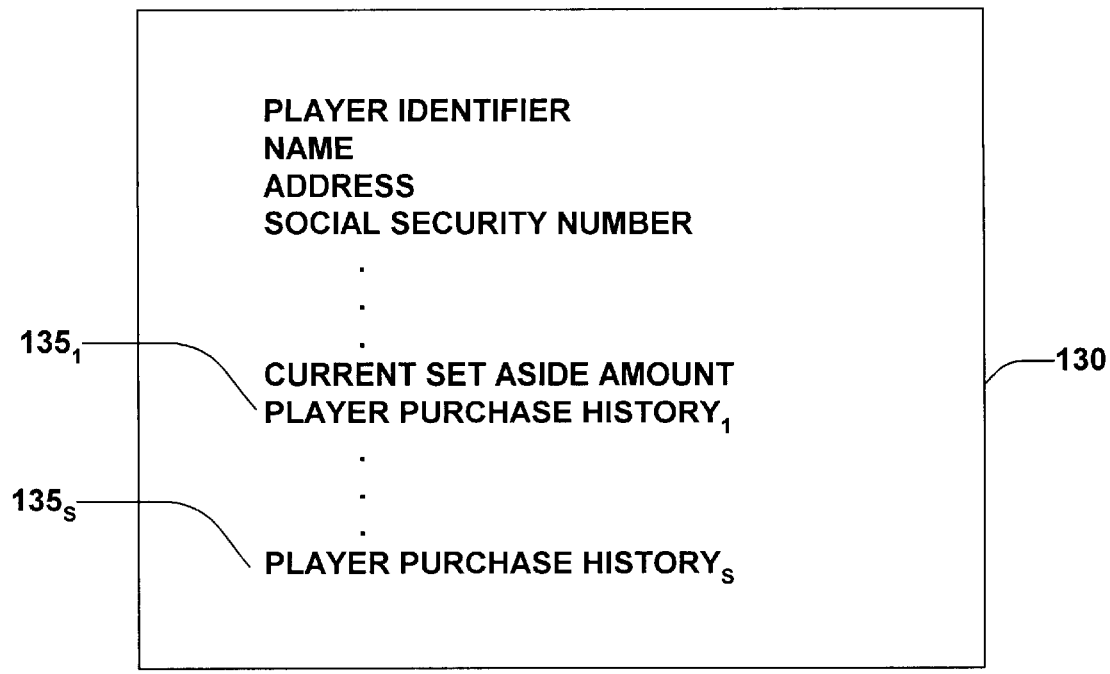
FIG. 2A is a block diagram depicting an exemplary data structure of data stored within registered player information.

The sponsor computer 120 is adapted to store registered player information $130_1$ through an Mth registered player information $130_M$, M being an integer. The registered player information $130_1$ through $130_M$ can be referred to collectively as the registered player information 130. As illustrated in FIG. 2A, the registered player information 130 includes information regarding the registered player (e.g., identifier, name, address, and/or social security number) along with a current set aside amount for the registered player. The current set aside amount for a registered player is increased by a predetermined portion of a registered player's purchase (e.g., ten percent). The sponsor (e.g., lottery agency) sets forth the predetermined portion of purchases that will be set aside.

The registered player information 130 can include a player purchase history $135_1$ through a player purchase history $135_S$, S being an integer. The player purchase history $135_1$ through player purchase history $135_S$ can be referred to collectively as the player purchase history 135. For example, the player purchase history 135 can include information regarding the date of a purchase, the time of day of a purchase, the location of a purchase, the amount of a purchase, any multi-week purchases, utilization of computer-aided game of chance item selection (e.g., random number generator, auto pick and/or auto lotto) and/or the game of chance involved in a purchase. The sponsor can utilize information contained in the registered player information 130 for targeted marketing campaigns, product development, and/or facilitating registered player income tax reporting (e.g., information regarding registered player's yearly purchases sent to registered player to provide evidence of a gambling loss deduction and/or enable a potential set off against winnings for a tax year).

The sponsor computer 120 is further adapted to electronically communicate with an account manager 140 which maintains a registered player account $150_1$ through an Lth registered player account $150_L$, L being an integer. The registered player account $150_1$ through $150_L$ can be referred to collectively as the registered player account 150. At a predetermined interval (e.g., monthly), set aside amounts for each registered player who has met the threshold (e.g., fifty dollars) for the predetermined reporting period (e.g., one year) are transferred to the registered player account 150. The amounts in the registered player account 150 are held by the account manager 140 for the benefit of the registered player for predetermined purposes (e.g., personal retirement account, medical savings account, real estate investment account, small business investment account and/or educational savings account). Set aside amounts remaining at the end of the predetermined reporting period (e.g., registered players who did not spend the threshold amount) can be transferred back to the sponsor and the set aside reinitialized to an amount predetermined by the sponsor.

Figure 2B:
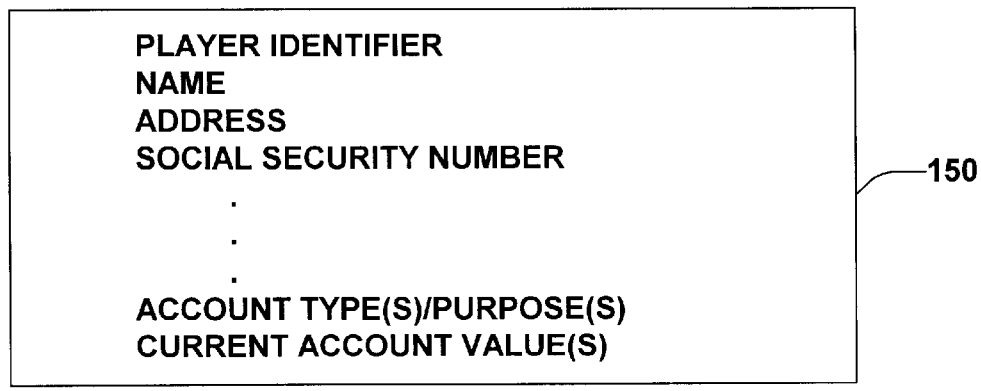
FIG. 2B is a block diagram depicting an exemplary data structure of data stored with a player account.

As illustrated in FIG. 2B, the registered player account 150 includes information regarding the registered player (e.g., player identifier, name, address and/or social security number) along with the account type(s)/purpose(s) (e.g., personal retirement account, medical savings account, real estate investment account, small business investment account and/or education savings account) and the current account value(s).

Those skilled in the art will appreciate that the point of sale computer 110 and/or the sponsor computer 120 may be practiced with numerous computer system configurations including, but not limited to, single-processor or multiprocessor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

For example, a player desirous of playing one hundred dollars on a state-run lottery would visit his local retailer that is equipped with a point of sale computer 110. The player would present appropriate identification to identify himself to the local retailer as a registered player. Once the point of sale computer 110 and/or the sponsor computer 120 has determined that the player is a registered player, the registered player would select and receive his lottery tickets in exchange for payment of one hundred dollars. The point of sale computer 110 would then electronically communicate the registered player's purchase information to the sponsor computer 120 which would then store the information in the registered player information 130. The sponsor computer would then calculate a predetermined portion of the registered player's purchase (e.g., ten percent) as a set aside amount for the registered player. For example, for a purchase of one hundred dollars with a predetermined percentage of ten percent, the registered player's set aside would be increased by ten dollars (ten percent of one hundred dollars). This set aside amount would then be transferred to the registered player account 150 at a predetermined interval (e.g., monthly) once the registered player has met a threshold amount (e.g., fifty dollars) during the reporting period (e.g., one year). Once the set aside amount has been transferred to the registered player account 150, it is available for the benefit of the registered player (e.g., retirement, medical expenses, real estate investment, small business investment and/or educational expenses) and is administered by the account manager 140. It is to be appreciated by those skilled in the art that the sponsor can serve as the account manager 140.

Figure 3:
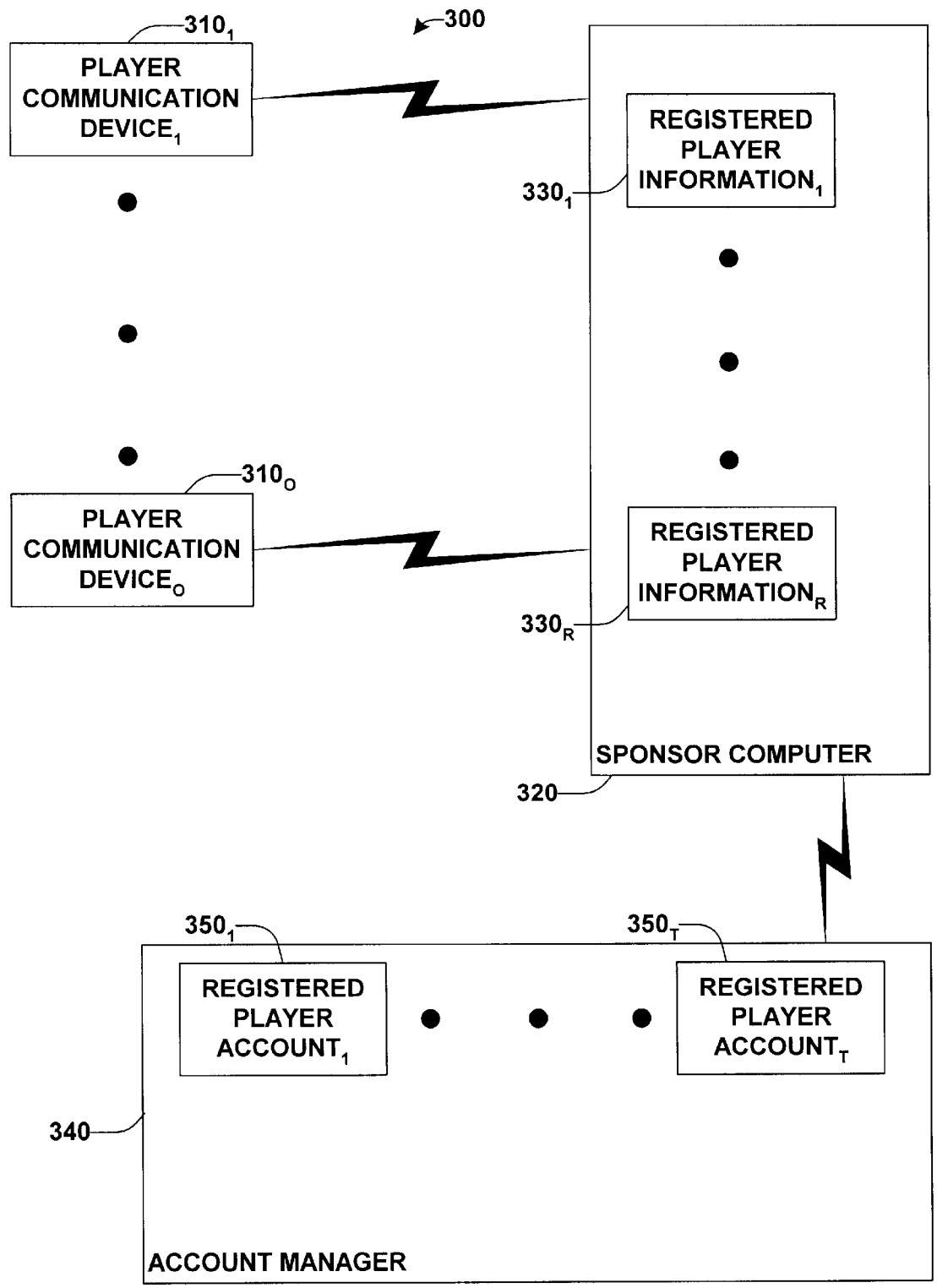
FIG. 3 is a schematic block diagram illustrating a game of chance proceed tracking system in accordance with an aspect of the present invention.

Turning now to FIG. 3, a game of chance proceed tracking system 300 is illustrated. The system 300 has a player communication device $310_1$ through an Oth player communication device $310_O$, O being an integer. The player communication device $310_1$ through $310_O$ can be referred to collectively as the player communication device 310. The player communication device 310 communicates electronically (e.g., via a direct connection, the Internet, dial-up modem connection, local area network, wide area network, wireless network or personal area network) with a sponsor computer 320 and is further adapted to identify the player as a registered player (e.g., utilizing a touch screen computer system, magnetic strip scanner, electronic signature pad, digital camera, finger print recognition system, iris scanner and/or alpha numeric entry device). The sponsor computer 320 is adapted to determine that a player is a registered player.

The sponsor computer 320 is further adapted to store a registered player information $330_1$ through an Rth registered player information $330_R$, R being an integer. The registered player information $330_1$ through $330_R$ can be referred to collectively as the registered player information 330. The registered player information 330 includes information regarding the registered player (e.g., identifier, name, address, social security number and/or player purchase history) along with a current set aside amount for the registered player. The current set aside amount for a registered player is increased by a predetermined portion of a registered player's purchase (e.g., ten percent).

The sponsor computer 320 is further adapted to electronically communicate with an account manager 340 which maintains a registered player account 350, through a Tth registered player account $350_T$, T being an integer. The registered player account $350_1$ through $350_T$ can be referred to collectively as the registered player account 350. At a predetermined interval (e.g., monthly), set aside amounts for each registered player who has met the threshold (e.g., fifty dollars) for the predetermined reporting period (e.g., one year) are transferred to registered player's account 350. The amounts in the registered player's account are held by the account manager 340 for the benefit of the registered player for predetermined purposes (e.g., retirement, medical expenses, real estate investment, small business investment and/or educational expenses). Set aside amounts remaining at the end of the predetermined reporting period (e.g., registered players who did not spend the threshold amount) can be transferred back to the sponsor and the set aside reinitialized to an amount predetermined by the sponsor.

For example, a registered player desirous of playing fifty dollars on a state-run lottery would log onto the state's web site via the player communication device 310 (e.g., personal computer). The registered player identifies himself by a unique identifier (e.g., password). The registered player then selects and receives his lottery tickets in exchange for payment (e.g., credit card, debit card, electronic wallet or removal from prepaid account) of fifty dollars. The sponsor computer 320 stores information regarding the registered player's purchase in the registered player information 330 and calculates a predetermined portion of the registered player's purchase (e.g., ten percent) as a set aside amount for the registered player. For example, for a purchase of fifty dollars with a predetermined percentage of ten percent, the registered player's set aside would be increased by five dollars (ten percent of fifty dollars). This set aside amount would then be transferred to the registered player account 350 at a predetermined interval (e.g., monthly) once the registered player has met a threshold amount (e.g., fifty dollars) during the reporting period (e.g., one year). Once the set aside amount has been transferred to the registered player account 350, it is available for the benefit of the registered player (e.g., retirement, medical expenses, real estate investment, small business investment and/or educational expenses) and is administered by the account manager 340. It is to be appreciated by those skilled in the art that the sponsor can serve as the account manager 340.

Figure 4:
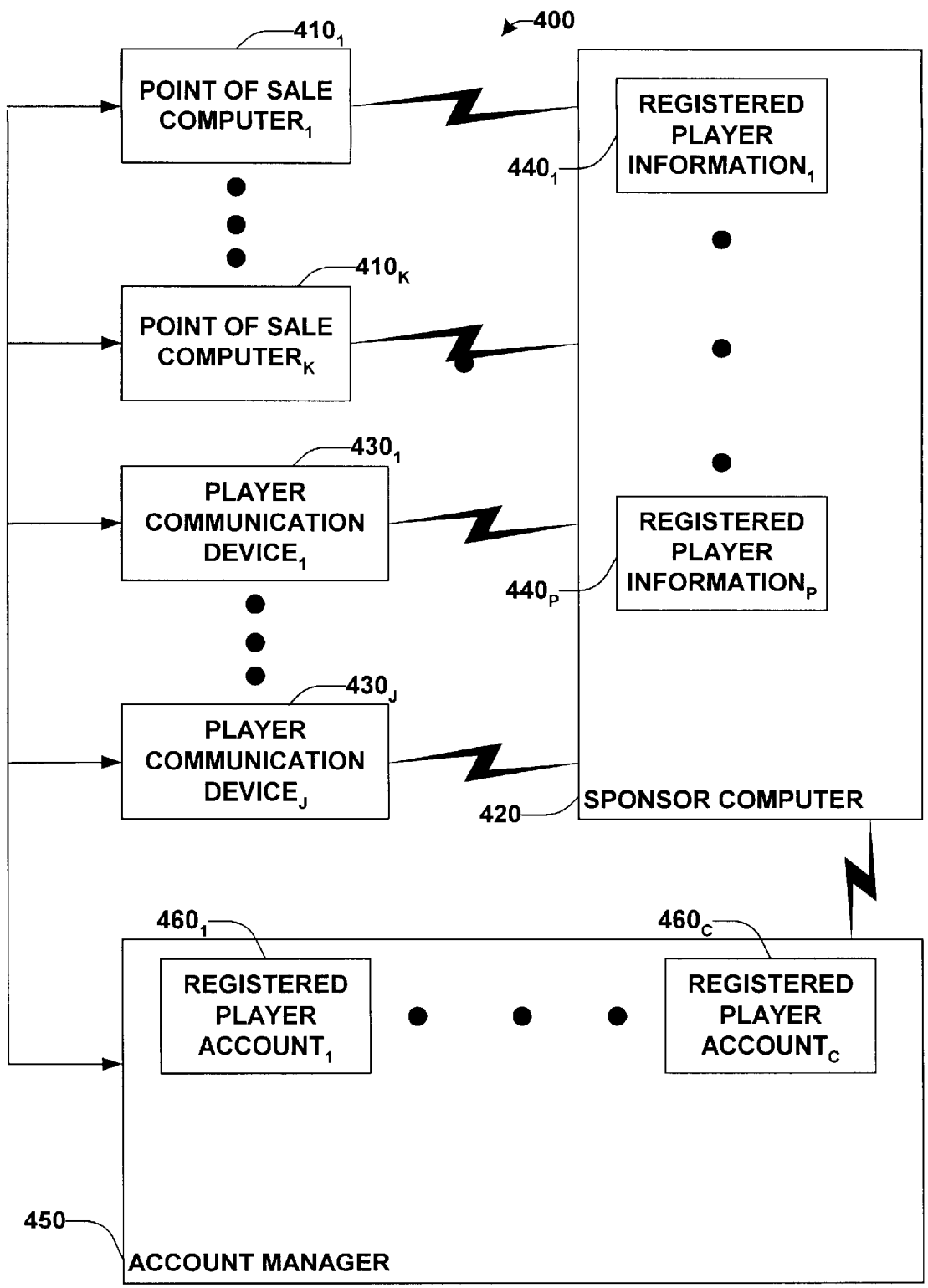
FIG. 4 is a schematic block diagram illustrating a game of chance proceed tracking system in accordance with an aspect of the present invention.

Referring to FIG. 4, a game of chance proceed tracking system 400 is illustrated. The system 400 includes a player communication device 430, through a Kth player communication device 430$_K$, K being an integer. The player communication device 430$_1$ through 430$_K$ can be referred to collectively as the player communication device 430. The player communication device 430 communicates electronically (e.g., via a direct connection, the Internet, dial-up modem connection, local area network, wide area network, wireless network or personal area network) with a sponsor computer 420 and is further adapted to identify a registered player (e.g., utilizing touch screen computer system, magnetic strip scanner, electronic signature pad, digital camera, finger print recognition system, iris scanner and/or alpha numeric entry device).

The system 400 further includes a point of sale computer 410$_1$ through an Jth point of sale computer 410$_J$, J being an integer. The point of sale computers 410$_1$ through 410$_J$ can be referred to collectively as the point of sale computer 410. The point of sale computer 410 communicates electronically (e.g., via a direct connection, the Internet, dial-up modem connection, local area network, wide area network, wireless network or personal area network) with a sponsor computer 420 and is further adapted to identify a registered player (e.g., touch screen computer system, magnetic strip scanner, electronic signature pad, digital camera, finger print recognition system, iris scanner and/or alpha numeric entry device). The identification of a registered player can be performed by the player or another person (e.g., store clerk). The sponsor computer 420 and/or the point of sale computer 410 are adapted to determine that a player is a registered player.

The sponsor computer 420 is adapted to receive player purchase information from the point of sale computer 410 and the player communication device 410 and to store registered player information 440$_1$ through a Pth registered player information 440$_P$, P being an integer. The registered player information 440$_1$ through 440$_P$ can be referred to collectively as the registered player information 440. The registered player information 440 includes information regarding the registered player (e.g., identifier, name, address, social security number and/or player purchase history) along with a current set aside amount for each registered player. The current set aside amount for a registered player is increased by a predetermined portion of a registered player's purchase (e.g., ten percent).

The sponsor computer 420 is adapted to electronically communicate with an account manager 450 which maintains a registered player account 460$_1$ through a Cth registered player account 460$_C$, C being an integer. The registered player account 460$_1$ through 460$_C$ can be referred to collectively as the registered player account 460. At a predetermined interval (e.g., monthly), set aside amounts for each registered player who has met the threshold (e.g., fifty dollars) for the predetermined reporting period (e.g., one year) are transferred to player's account 460. The amounts in the player's account are held by the account manager 450 for the benefit of the registered player for predetermined purposes (e.g., retirement, medical expenses, real estate investment, small business investment and/or educational expenses). Set aside amounts remaining at the end of the predetermined reporting period (e.g., registered players who did not spend the threshold amount) can be transferred back to the sponsor and the set aside reinitialized to an amount predetermined by the sponsor.

The system 400 further provides for registered players to make additions to their registered player account 460. This can be accomplished by the player communication device 430 communicating electronically (e.g., via a direct connection, the Internet, dial-up modem connection, local area network, wide area network, wireless network or personal area network) with the account manager 450. Additions to registered player account 460 can also be accomplished through the point of sale computer 410 (e.g., cash tendered at location of point of sale computer).

For example, a registered player can utilize his player communication device (e.g. personal computer) to electronically communicate via the Internet with the account manager 450 in order to deposit additional funds into his personal retirement account. The deposit can take place by electronic means (e.g., credit card, debit card, electronic wallet or electronic transfer of funds).

Further, a portion of a registered player's winnings can also be diverted to the registered player account 460. For example, a registered player can designate that a portion (e.g., twenty five percent) of winnings associated with a purchase be transferred to his registered player account 460.

FIG. 5, FIG. 6, FIG. 7, FIG. 8 and FIG. 10 described below, illustrate a methodology for providing various aspects of tracking lottery proceeds in accordance with the present invention. It will be appreciated that the method may be implemented in the systems and tools described supra, and further that the method may be practiced in other systems not illustrated. While for purposes of simplicity of explanation, the methodology is shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement a methodology in accordance with the present invention.

Figure 5:
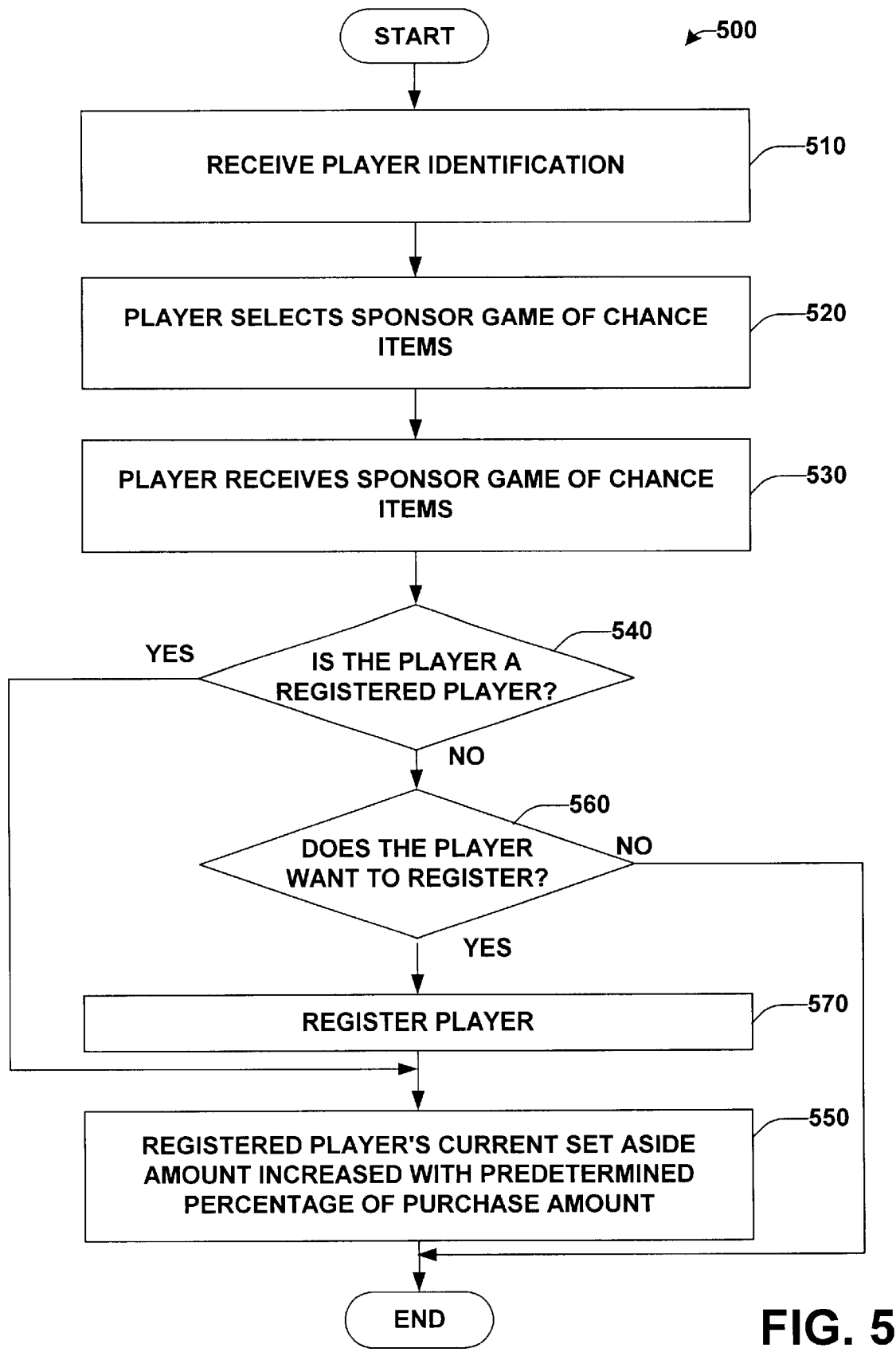
FIG. 5 is a flow diagram illustrating an exemplary method for tracking game of chance proceeds.

Referring now to FIG. 5, an exemplary method 500 for tracking lottery proceeds is illustrated. Beginning at 510, a point of sale computer (e.g., lottery retail terminal) receives a player's identification. At 520, the player selects his game of chance items (e.g., selects lottery tickets). At 530, the player receives his game of chance items (e.g., receives his lottery tickets). At 540, a determination is made concerning whether the player is a registered player. If the determination at 540 is NO, then at 560 a determination is made whether the player wants to register. If the determination at 560 is YES, then at 570 the player is registered. If the determination is YES, processing continues at 550. If the determination at 560 is NO, no further action is taken. At 550, the registered player's current set aside amount is increased with a predetermined percentage of the purchase amount (e.g., ten percent of play).

Figure 6:
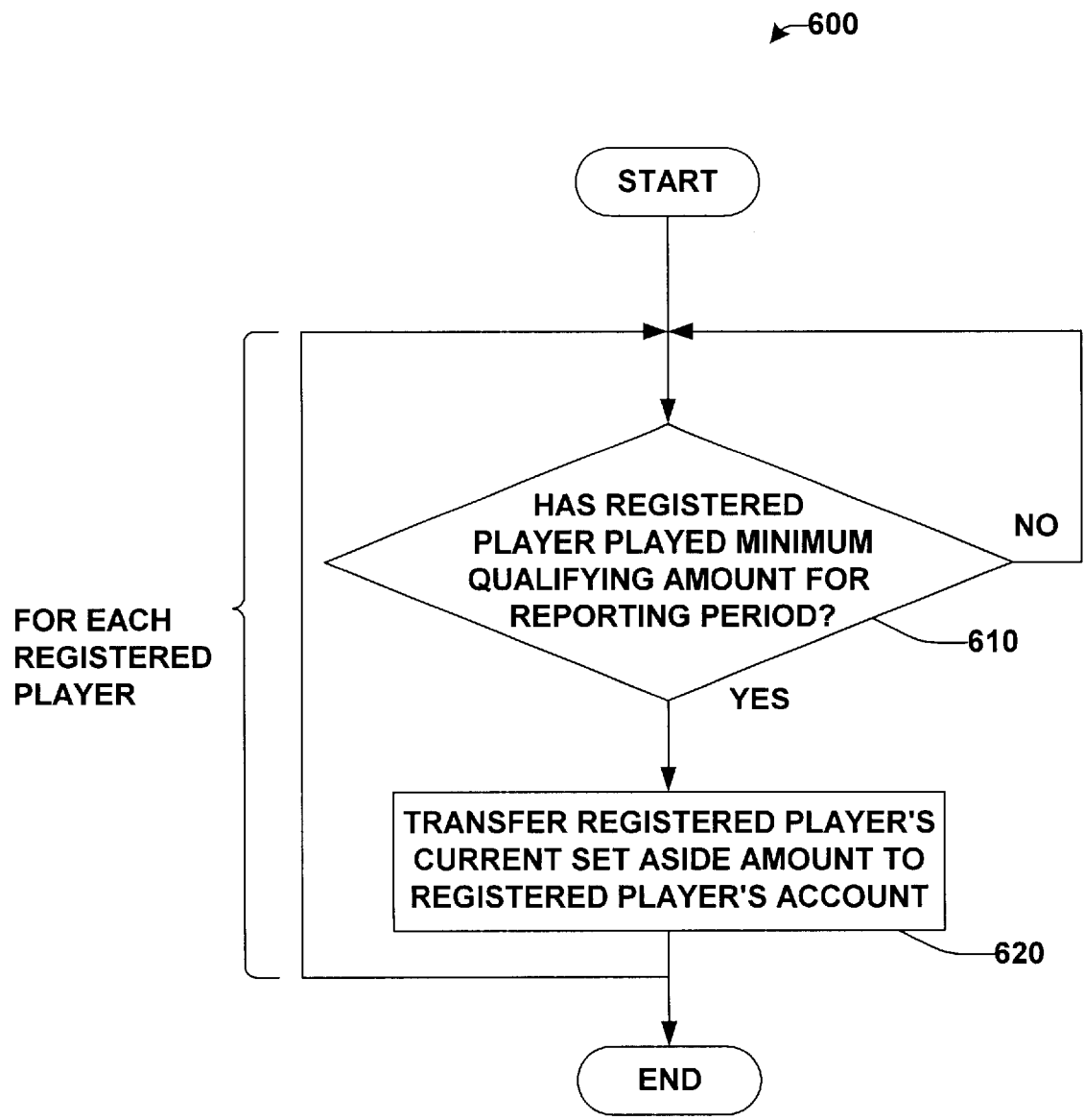
FIG. 6 is a flow diagram illustrating an exemplary method for transferring registered player's set aside amounts to registered player's accounts.

FIG. 6 illustrates an exemplary method for transferring registered player's set aside amounts to a registered player's account. Beginning at 610, for each registered player, a determination is made whether the registered player has played the minimum qualifying amount (e.g., five hundred dollars). If the determination at 610 is NO, no further action is taken with regard to the registered player. If the determination at 610 is YES, the current set aside amount for the registered player is transferred to the registered player's account.

Figure 7:
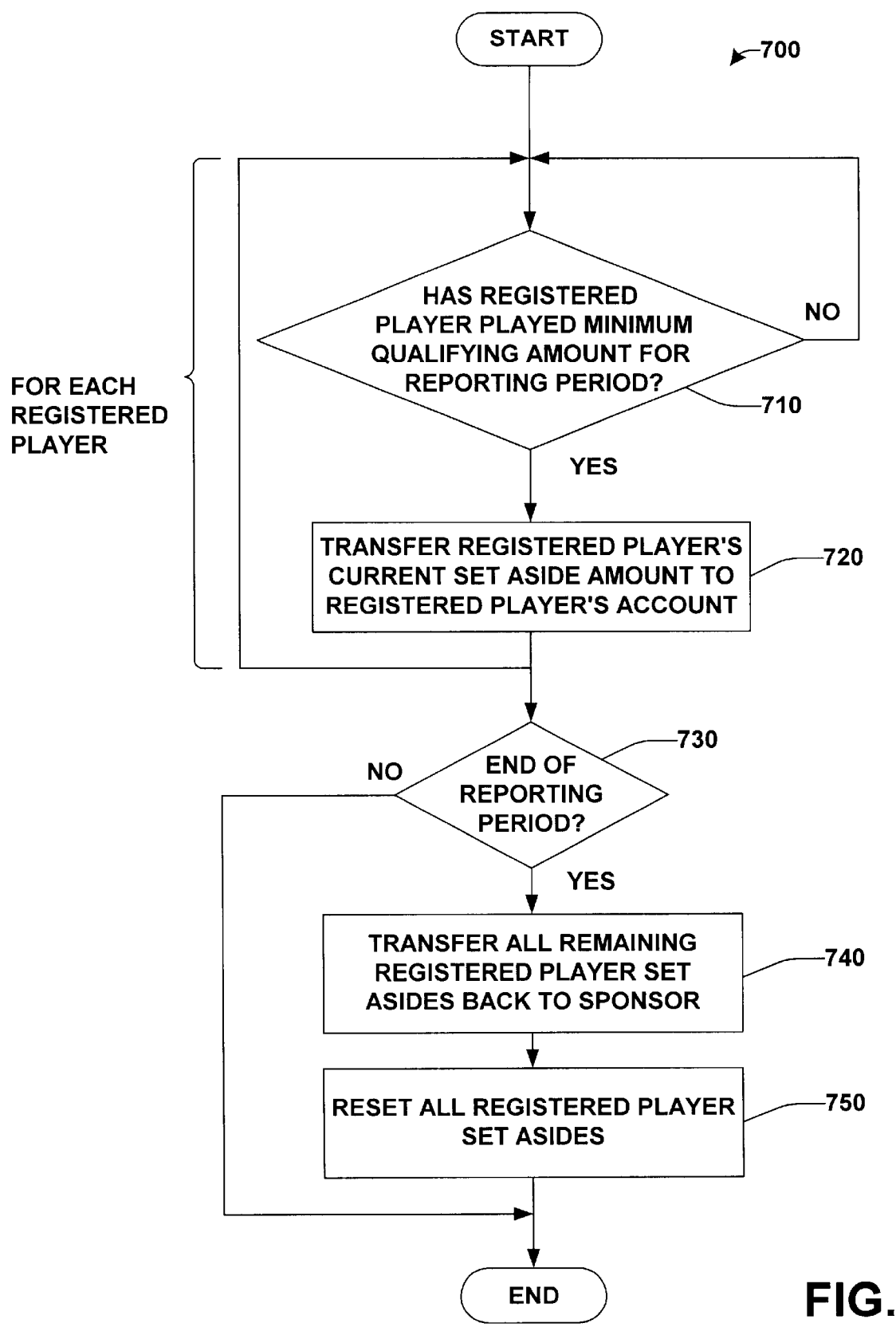
FIG. 7 is a flow diagram illustrating an exemplary method for transferring registered player's set aside amounts to registered player's accounts.

FIG. 7 illustrates an exemplary method for transferring registered player's set aside amounts to a registered player's account. Beginning at 710, for each registered player, a determination is made whether the registered player has played the minimum qualifying amount (e.g., five hundred dollars) for the reporting period. If the determination at 710 is NO, no further action is taken with regard to the registered player. If the determination at 710 is YES, at 720, the current set aside amount for the registered player is transferred to the registered player's account.

Once 710 and 720 have been performed for each registered player, at 730 a determination is made whether the end of the reporting period has occurred (e.g., end of sponsor's fiscal year). If the determination at 730 is NO, no further action is taken. If the determination at 730 is YES, all remaining registered player set asides are transferred back to the sponsor. At 740, all registered player set asides are reset to an amount predetermined by the sponsor.

Figure 8:
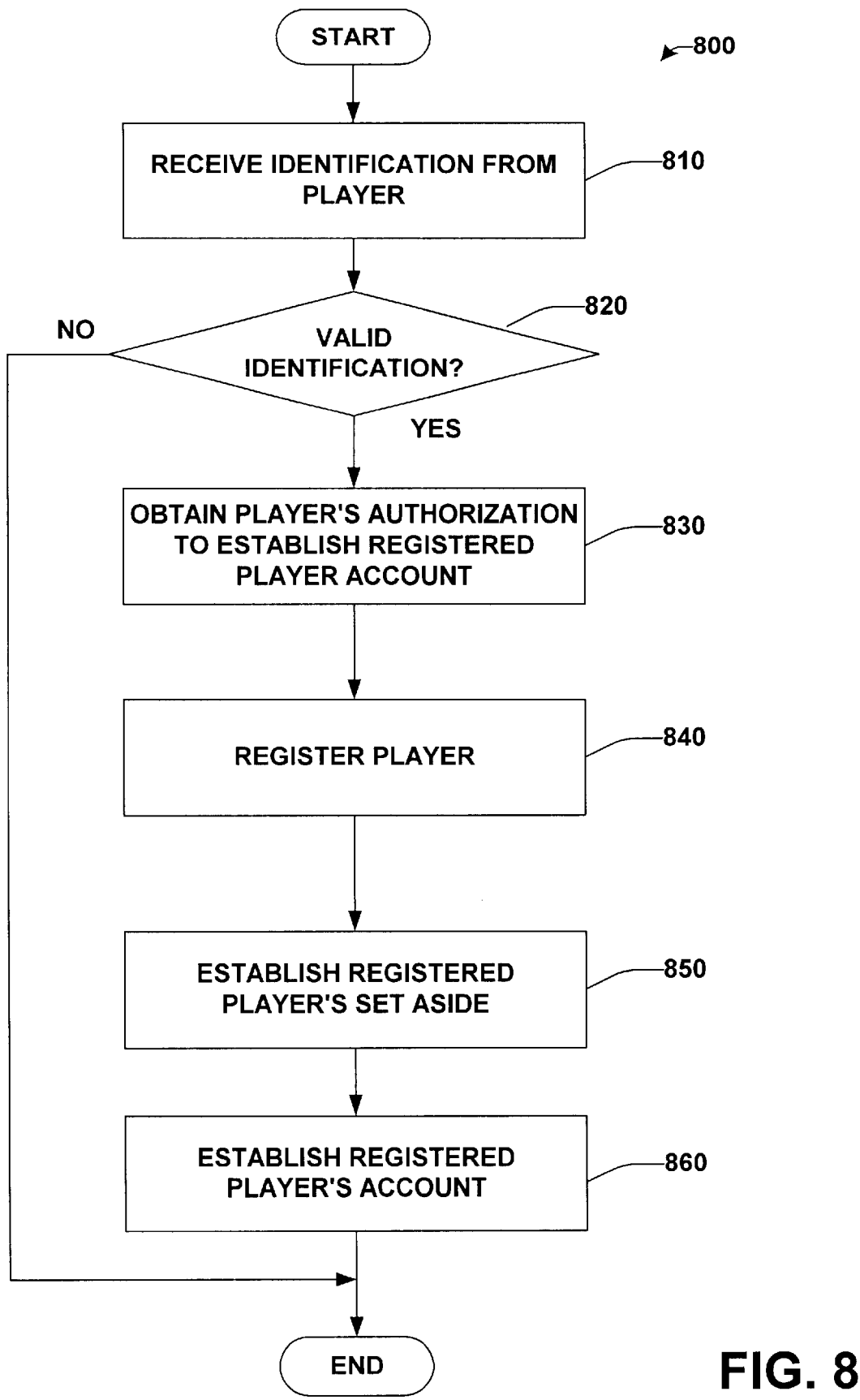
FIG. 8 is a flow diagram illustrating an exemplary method for establishing a registered player's set aside and a registered player's account.

FIG. 8 illustrates an exemplary method for establishing a player's set aside and a registered player's account. At 820, a determination is made as to whether the identification is valid. If the determination at 820 is NO, no action is taken. If the determination at 820 is YES, at 830 the player's authorization to establish a registered player's account is obtained. At 840, the player is registered (e.g., name, address and/or other unique identifying means obtained) by the sponsor. At 850, a registered player's set aside is established for the player. At 860, a registered player's account is established for the player.

Figure 10:
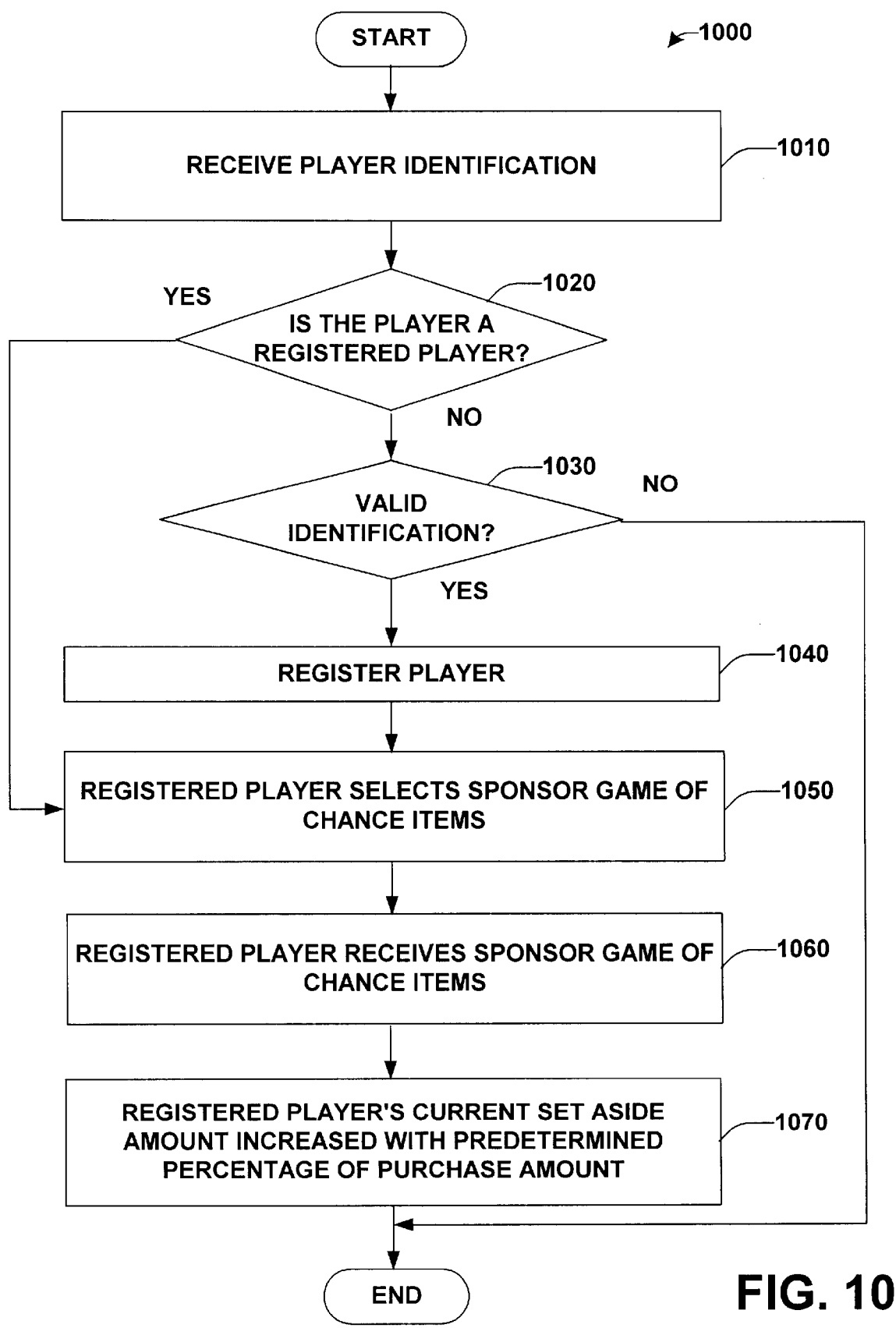
FIG. 10 is a flow diagram illustrating an exemplary method for tracking game of chance proceeds.

Referring now to FIG. 10, an exemplary method 1000 for tracking lottery proceeds is illustrated. Beginning at 1010, a point of sale computer (e.g. lottery retail terminal) receives a player's identification. At 1020, a determination is made concerning whether the player is a registered player. If the determination at 1020 is YES processing continues at 1050. If the determination at 1020 is NO, at 1030 at determination is made concerning whether the identification is valid. If the determination at 1030 is NO, no further processing occurs. If the determination at 1030 is YES, at 1040 the player is registered. At 1050, the registered player selects his game of chance items (e.g., selects lottery tickets). At 1060, the registered player receives his game of chance items (e.g., receives his lottery tickets). At 1070, the registered player's current set aside amount is increased with a predetermined percentage of the purchase amount (e.g., ten percent of play).

Figure 9:
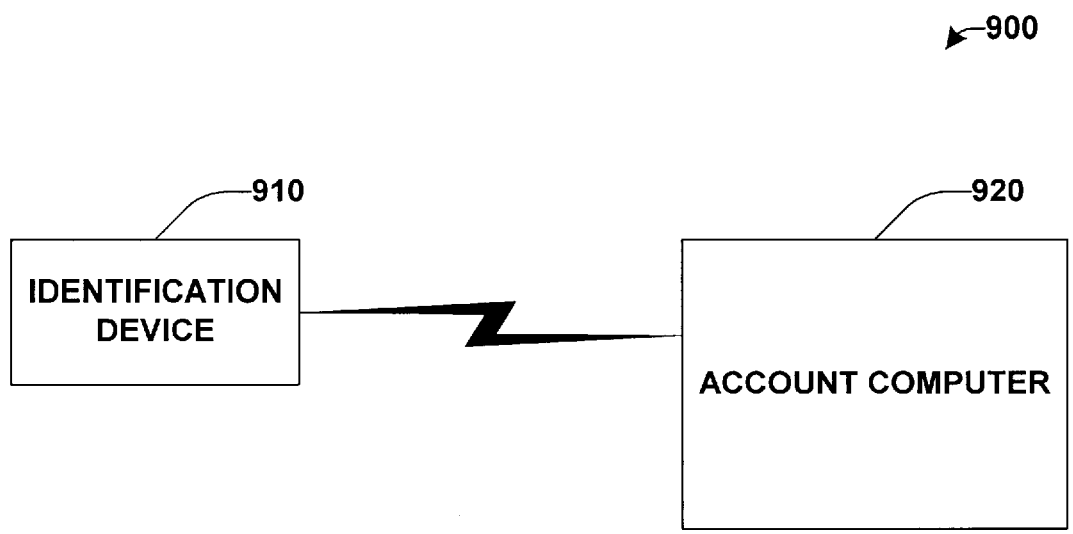
FIG. 9 is a schematic diagram illustrating an identification device electronically communicating with an account computer.

Referring to FIG. 9, a system 900 for an identification device 910 electronically communicating with an account computer 920 is illustrated. The identification device 910 can be, for example, a touch screen computer system, magnetic strip scanner, electronic signature pad, digital camera, telephone and/or alpha numeric entry device. The identification device 910 provides electronic means to uniquely identify a player to the account computer 920. The identification device 910 further provides means for a player to provide an electronic or digital signature indicating that the player has read and understood the rules and regulations of the game of chance and/or the account rules and/or regulations. The account computer 920 is adapted to establish an account for the player utilizing the information electronically communicated to the account computer 920 electronically.

While the invention has been described above in the general context of computer-executable instructions that may run on one or more computers, those skilled in the art will recognize that the invention also may be implemented in combination with other program modules and/or as a combination of hardware and software. Generally, program modules include routines, programs, components, data structures, etc. that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

It is to be appreciated by those skilled in the art that the system and method of the present invention are adaptable to tracking proceeds of any game of chance and rewarding individual players based on the amounts of play. While the present invention has been described in terms of a fixed predetermined amount (e.g., ten percent) being applied to determine the set aside amount, the predetermined amount can be a function; for example, the predetermined amount can be a function of the amount played over a period of time, thus, increased play results in a higher percentage being set aside. The predetermined amount being a function of the amounts directly contributed to the registered player account by the registered player is an additional example of the predetermined amount being a function. The predetermined amount can also vary, for example, depending upon a particular period of time the registered player has played the game of chance, the particular game of chance played, the time of day and/or the location game of chance items were purchased.

While the registered player accounts have been described as separate accounts for each registered player, it is to be appreciated by those skilled in the art that the registered player accounts can be a single or plurality of accounts held for the benefit of registered players. Further, a registered player account can be utilized by a single sponsor, a group of sponsors acting in concert and/or a plurality of sponsors.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising", as comprising is interpreted as a transitional word in a claim.

What is claimed is:

1. A game of chance proceed tracking system, comprising:
   at least one point of sale computer adapted to facilitate registered player purchases and further adapted to electronically communicate registered player purchase information in response to a registered player's purchase of a game of chance item; and,
   a sponsor computer adapted to electronically receive registered player purchase information from the at least one point of sale computer, store the registered player purchase information and calculate a set aside amount based upon the registered player's purchase information, wherein availability of the set aside amount is not dependent upon a result of the game of chance item.

2. The game of chance proceed tracking system of claim 1, wherein the system further comprises an account manager which manages at least one registered player account and is adapted to communicate electronically with the sponsor computer.

3. The game of chance proceed tracking system of claim 2, wherein the at least one registered player account is maintained by the account manager for the benefit of the registered player and/or the registered player's designate.

4. The game of chance proceed tracking system of claim 2, wherein the at least one registered player account is at least one of a personal retirement account, a medical savings account, a real estate investment account, a small business investment account and an educational savings account.

5. The game of chance proceed tracking system of claim 2, wherein the at least one registered player account includes an account value and at least one of registered player identification number, registered player name, registered player address, registered player telephone number and registered player social security number.

6. The game of chance proceed tracking system of claim 1 wherein the registered player purchase information includes at least one of registered player identification number, registered player name, registered player address, registered player social security number, registered player telephone number, registered player purchase history and current set aside amount.

7. The game of chance proceed tracking system of claim 6 wherein the registered player purchase information is utilized by the sponsor for at least one of targeted marketing, product development and facilitating registered player income tax reporting.

8. The game of chance proceed tracking system of claim 6 wherein the registered player purchase history includes at least one of a date of purchase, a time of day of purchase, a location of purchase, an amount of purchase, information regarding multi-week purchase, information regarding utilization of computer-aided game of chance item selection and game of chance involved.

9. The game of chance proceed tracking system of claim 1 wherein the at least one point of sale computer and the sponsor computer communicate electronically by at least one of a direct connection, the Internet, a dial-up modem connection, a local area network, a wide area network, a wireless network and a personal area network.

10. The game of chance proceed tracking system of claim 1 wherein the game of chance is a state-sponsored lottery.

11. The game of chance proceed tracking system of claim 1 wherein the game of chance item is at least one of a lottery ticket, a scratch and win ticket, a purchase from a video lottery terminal and an instant bingo ticket.

12. The game of chance proceed tracking system of claim 1 wherein the calculation of the set aside amount is a function of one of an amount played over a period of time by the registered player, an amount directly contributed to the registered player account by the registered player, a period of time the registered player has played the game of chance, the game of chance played by the registered player, the time of day the registered player played the game of chance and a location of the point of sale computer.

13. A game of chance proceed tracking system, comprising:
    at least one player communication device adapted to facilitate registered player purchases and further adapted to electronically communicate registered player purchase information in response to a registered player's purchase of game of chance items; and,
    a sponsor computer adapted to electronically receive registered player purchase information, store the registered player purchase information and calculate a set aside amount based upon the registered player's purchase information, wherein availability of the set aside amount is not dependent upon a result of the game of chance item.

14. The game of chance proceed tracking system of claim 13 wherein the at least one player communication device is a one of personal computer, a remote terminal, telephone and a personal digital assistant.

15. The game of chance proceed tracking system of claim 13, wherein the system further comprises an account manager which manages at least one registered player account and is adapted to communicate electronically with the sponsor computer.

16. The game of chance proceed tracking system of claim 15, wherein the at least one registered player account is maintained by the account manager for the benefit of the registered player and/or the registered player's designate.

17. The game of chance proceed tracking system of claim 15, wherein the at least one registered player account is at least one of a personal retirement account, a medical savings account, a real estate investment account, a small business investment account and an educational savings account.

18. The game of chance proceed tracking system of claim 15, wherein the at least one registered player account includes an account value and at least one of registered player identification number, registered player name, registered player address, registered player telephone number and registered player social security number.

19. The game of chance proceed tracking system of claim 13 wherein the registered player purchase information includes at least one of registered player identification number, registered player name, registered player address, registered player social security number, registered player telephone number, registered player purchase history and current set aside amount.

20. The game of chance proceed tracking system of claim 19 wherein the registered player purchase information is utilized by the sponsor for at least one of targeted marketing, product development and facilitating registered player income tax reporting.

21. The game of chance proceed tracking system of claim 13 wherein the at least one point of sale computer and the sponsor computer communicate electronically by at least one of a direct connection, the Internet, a dial-up modem connection, a local area network, a wide area network, a wireless network and a personal area network.

22. The game of chance proceed tracking system of claim 13 wherein the calculation of the set aside amount is a function of one of an amount played over a period of time by the registered player, an amount directly contributed to the registered player account by the registered player, a period of time the registered player has played the game of chance, the game of chance played by the registered player, the time of day the registered player played the game of chance and a location of the point of sale computer.

23. The game of chance proceed tracking system of claim 13 further comprising at least one point of sale computer adapted to electronically communicate registered player purchase information to the sponsor computer.

24. The game of chance proceed tracking system of claim 13 wherein the game of chance is a state sponsored lottery.

25. The game of chance proceed tracking system of claim 13 wherein the game of chance item is at least one of a lottery ticket, a scratch and win ticket, a purchase from a video lottery terminal and an instant bingo ticket.

26. In a computer environment, a method for tracking game of chance proceeds comprising:

receiving player identification;

selecting sponsor game of chance item;

purchasing sponsor game of chance item;

receiving sponsor game of chance item;

determining whether the player is a registered player; and, increasing a registered player's current set aside amount with a predetermined amount of a purchase amount wherein availability of the set aside amount is not dependent upon a result of the game of chance item.

27. The method of claim 26 further comprising registering a player.

28. The method of claim 26 wherein the predetermined amount of a purchase amount is a function of one of an amount played over a period of time by the registered player, an amount directly contributed to the registered player account by the registered player, a period of time the registered player has played the game of chance, the game of chance played by the registered player, the time of day the registered player played the game of chance and a location of a point of sale computer.

29. In a computer environment, a method for tracking lottery proceeds comprising:

determining whether a registered player has played a minimum qualifying amount for a reporting period;

transferring the registered player's current set aside amount to the registered player's account;

determining whether the reporting period has ended;

transferring remaining registered player set aside amounts back to a sponsor; and, initializing registered player set asides.

30. The method of claim 29 furthering comprising registering a player.

31. A computer-readable medium having computer-executable instructions for performing the following steps:

receiving player identification;

selecting sponsor game of chance item;

purchasing sponsor game of chance item;

receiving sponsor game of chance item;

determining whether the player is a registered player; and, increasing a registered player's current set aside amount with a predetermined amount of a purchase amount, wherein availability of the set aside amount is not dependent upon a result of the game of chance item.

32. The computer-executable medium having computer-executable instructions of claim 31 further comprising the step of registering a player.

33. The computer-executable medium having computer-executable instructions of claim 31 wherein the predetermined amount of a purchase amount is a function of one of an amount played over a period of time by the registered player, an amount directly contributed to the registered player account by the registered player, a period of time the registered player has played the game of chance, the game of chance played by the registered player, the time of day the registered player played the game of chance and a location of the point of sale computer.

34. A game of chance proceed tracking system, comprising:

means for electronically communicating a registered player's purchase information to a sponsor computer;

means for receiving the registered player's purchase information;

means for storing the registered player's purchase information;

means for calculating a registered player set aside amount based upon the registered player's purchase information, wherein availability of the set aside amount is not dependent upon a result of a game of chance item;

means for electronically communicating the registered player set aside amount to an account manager; and, means for maintaining a registered player account.

35. A signal for communicating between a sponsor computer and at least one point of sale computer, comprising:

a sponsor computer adapted to electronically receive registered player purchase information from at least one point of sale computer, wherein the sponsor computer,stores the registered player purchase information; and, wherein the sponsor computer calculates a registered player set aside based upon the registered player purchase information, wherein availability of the set aside amount is not dependent upon a result of the game of chance item.

* * * * *